United States Patent Office 3,504,810
Patented Apr. 7, 1970

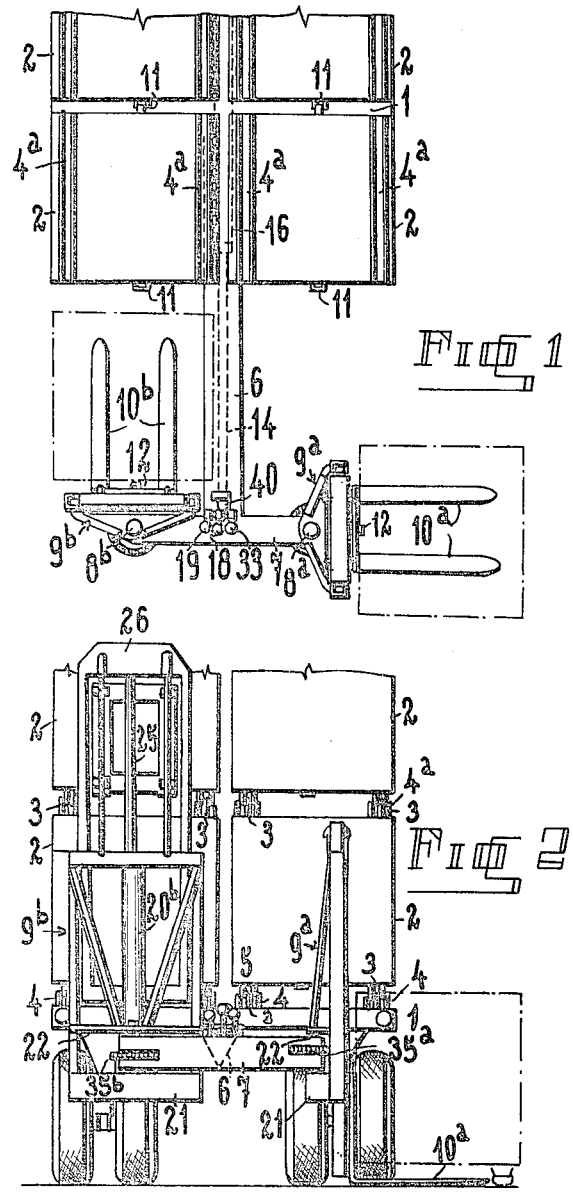

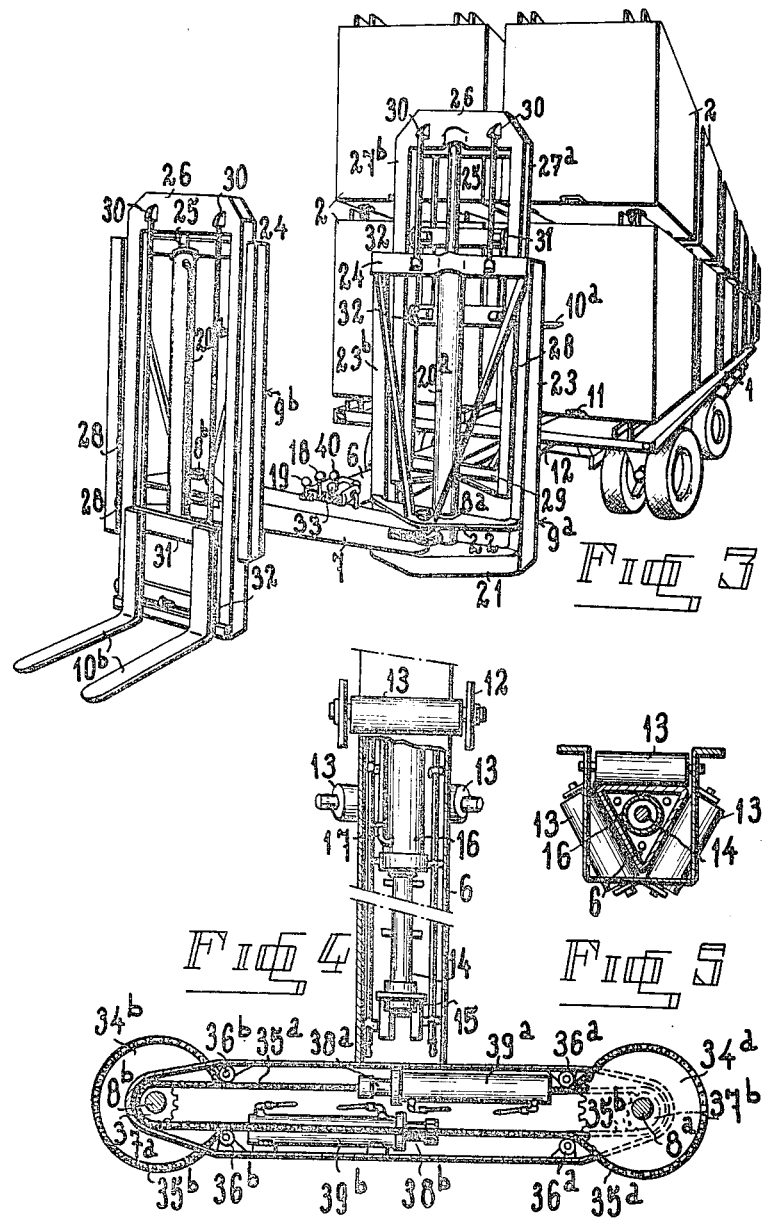

3,504,810
TRUCK PROVIDED WITH A LOADING DEVICE
Fedde Walda, Leendert Sparreboomstraat 15,
Rotterdam, Netherlands
Filed Feb. 26, 1968, Ser. No. 708,141
Claims priority, application Netherlands, Feb. 28, 1967,
6703389
Int. Cl. B60p 1/46
U.S. Cl. 214—75                           2 Claims

ABSTRACT OF THE DISCLOSURE

A truck has a loading device for placing containers in two rows extending longitudinally of the loading surface of the truck. The device comprises a support arm which extends centrally and longitudinally of the loading surface and is parallel thereto, and which is longitudinally displaceable. A horizontal cross arm is mounted on the outer end of the support arm so as to extend laterally of the support arm, and a vertically extending frame is pivoted to the cross arm on a vertical axis that is substantially displaced from the support arm. A fork is vertically movable in the frame in order to pick up a container and then, after pivoting of the frame, to deposit the container on the loading surface at the rear end of one of two rows of containers extending longitudinally of the loading surface.

BACKGROUND OF THE INVENTION

The invention relates to a truck, provided with a loading device, comprising a frame for a platform or fork which platform or fork can be raised or lowered within said frame.

The application of a loading device in connection with a truck is generally known. In general such loading devices can be divided into two main groups, the first group consisting of loading devices which are adapted for a load having an especial shape, which load can be positioned on the loading surface of the truck, and the second group consisting of loading devices in which the load can be only raised and lowered, after which the positioning of the load on the loading surface must be performed by hand or by means of a separate device. The loading devices, belonging to the first main group and which are adapted to the shape of the load, such as rolls of paper or large containers, form a part of the truck, which is also adapted for handling such loads. The loading devices of the second group are mostly used for handling piece goods.

Nowadays containers are used more and more, which containers are of special standardized shape and the trucks are adapted for the size of the containers. Such containers however, are of such a size, that only one or two containers can be used on a truck and the loading devices for such containers are shaped in such a manner, that the construction of the truck is entirely independent of the construction of the loading device e.g. in the shape of a slope. With a view to conserving the time of the driver and expediting loading and unloading of the truck because of the limited number of places available for loading and unloading trucks, it is desired to transport goods in relatively small containers, owing to which the deliveries of the goods at different addresses can be executed successively. For each address one or more containers can be used and when during the loading of the truck the successive addresses are taken in account the containers can be delivered successively without wasting time in shifting the load on the loading surface of the truck e.g. for removing a less accessible container.

With the above drawbacks in view it is possible to facilitate the transportation of piece goods by making use of relatively small containers for these goods, in each of which containers the goods for only one address are stored.

SUMMARY OF THE INVENTION

The object of the invention is to provide a truck, having a loading device connected thereto by which separate containers from a large number of containers can be handled, which containers are situated on the loading surface of the truck and according to the invention this is attained with a loading device, which is substantially characterized by a support arm, which is displaceable parallel to the loading surface, on which support arm a frame for the platform or fork can turn around a vertical axis.

The advantage of such an arrangement is, that the loading device is not only usable for lifting the containers situated on the load surface, but also can be shifted in a direction parallel to the support arm. Another advantage of the loading device according to the invention is obtained owing to the fact, that the loading device can be used also for piece goods without the need of altering the construction of the loading device.

A practical embodiment according to the invention is obtained in that the frame for the platform or the fork runs laterally of the side of the support arm, which frame can be extended below the support arm at different positions around the vertical pivot axis by which pivot the frame can rotate. Further the support arm is provided with a cross arm at the end of which the pivot axis for the frame of the platform or fork is situated, whereas the length of the support arm and the cross arm is such that the frame can be turned into a position lateral of the support arm at that side of the cross arm, which is directed towards the truck. The containers can now be delivered outside of the lateral plane of the truck, whereas the container by the pivotable mounting of the frame of the platform can be brought in front of the loading surface.

It is advantageous that the support arm can be retracted to the loading surface so far that when the frame is directed towards the loading surface a lifted platform or fork can extend entirely above the loading surface, as a result of which it is possible to shift the containers which have been placed on the loading surface by means of the container supported by the loading device as this container can push the containers on the loading surface, when this container is brought above the loading surface.

When the containers are so small, that two rows of containers extending longitudinally of the truck can be positioned on the loading surface, it is advantageous that a cross arm at the end of the support arm extend at both sides of this support arm and both of the free ends of the cross arm can be provided with a vertical pivot axis for the frame of a platform or fork. The shifting of the containers over the loading surface as described above, is possible because the truck, having the loading device connected thereto, is adapted in such a manner, that the support arm is movable in the central plane of symmetry of the truck longitudinally of same and by the fact, that the support arm co-operates with a double acting hydraulic ram for a reciprocal movement of the support arm. Further it is advantageous that the cross arm be provided with one or more hydraulic rams for turning the frame for the platform or the fork around its vertical axis.

BRIEF DESCRIPTION OF THE DRAWINGS

FIG. 1 is a top view of the rear end of a truck adapted for the transport of containers for goods, provided with a loading device connected to the rear end of the truck.

FIG. 2 is a rear view of the truck provided with the loading device according to FIG. 1.

FIG. 3 is a perspective view of the loading device together with the rear part of the truck as shown in the FIGS. 1 and 2.

FIG. 4 is a horizontal section of the support arm and a cross arm of the loading device, and FIG. 5 is a vertical section through the support arm.

DESCRIPTION OF THE PREFERRED EMBODIMENT

Containers 2 can be placed on a loading surface 1 of a truck. In the embodiment shown in the FIGS. 1, 2 and 3, two rows of containers are positioned longitudinally of the truck, whereas further a second layer of containers is placed on the containers which are already positioned on the loading surface. The containers 2 are adapted for taking up piece goods and the containers are provided with rollers 3 or wheels in a known manner. The rollers 3 of the lower containers run in rails 4, situated on the loading surface 1. Such rails are also provided on the top surface of the containers as indicated by the reference numeral 4a, owing to which the rollers 3 of the uppermost containers can fit in the rails of the lower containers, which are directly supported by the rails 4 on the loading surface. The rails 4 and 4a are provided with upward projecting flanges and the containers can be fastened to the rails in a known manner, owing to which the containers cannot capsize e.g. when driving at high speed in a curve of the road. A guide for the support arm 6 is situated below the loading surface 1. Further the support arm 6 is situated in the centre line of the truck and the support arm can project at the rear of the truck. The end of the support arm 6 possesses a cross arm 7 and pivots 8a and 8b are situated at the ends of the cross arm 7.

A frame 9a or 9b can turn by means of the pivot 8a or 8b respectively. The frames 9a and 9b serve for guiding a platform or fork 10a or 10b respectively in a vertical direction. Thus the frames 9a and 9b can be turned around a vertical axis over an angle of 180°. A load placed on the fork 10a and 10b can be lifted and further the load can be turned around a vertical axis of the pivot 8a or 8b. The load can be displaced also longitudinally of the truck, because the support arm 6 can be displaced longitudinally of the truck. The support arm can be retracted so far, that a load, situated on the fork can entirely be situated above the loading surface. When now a new load which was placed laterally of the truck, as shown in the FIGS. 1 and 2 by a dash-dotted line, is to be lifted and the frame 9a has been turned around its pivot 8a in such a position that the frame 9a comes at that side of the cross arm 7 which is directed towards the truck, and further the load is lifted so high that it reaches above the level of the loading surface, it is possible to displace the containers 2, which already have been placed on the loading surface. This is attained by retracting the support arm 6 and the container, which is still on the fork 10a, pushes against the rear container on the loading surface. The containers which are already placed on the loading surface will be displaced until the support arm 6 is entirely retracted and the container on the fork 10a comes entirely above the loading surface 1 of the truck. The containers 2 are provided with coupling links for coupling a train of containers which are situated on the loading surface 1 of the truck. The coupling links are indicated by the reference numeral 11 in FIG. 1.

The coupling links 11 are adapted in such a manner, e.g. in the shape of a hook and eyelet, that when the rear container is lifted up the coupling links will automatically be disconnected.

When a container is to be removed from the truck the arm 6 is in a retracted position and the fork 10a or 10b reaches under a container. The fork is lifted over a small distance, owing to which the hook 12 on the fork enters the eyelet coupling link 11 of the container. Further the arm 6 is extended from the truck owing to which the train of containers is drawn over the loading surface. When the hook 12 of the fork comes in the eyelet of the coupling link 11, the fork engages the bottom of the container 2. When the support arm 6 is extended so far in a rearwards direction that the container, situated on the fork, is entirely free from the loading surface, the container and the fork can be lifted further owing to which the coupling with the next container is released, thus that container is in the most rearwards position on the loading surface. Further the arm 6 can be extended further and the frame 9a or 9b can be turned around its pivot 8a or 8b and the container on the fork can be lowered in order to deliver the container at the bottom.

The frame 9a or 9b is adapted in such a manner, that the fork can be lowered laterally of the supporting arm 6 and the cross arm 7.

When two layers of containers are to be situated on the truck, as shown in the drawings in the same manner, a container of the uppermost layer can be loaded and unloaded.

The construction of the loading device will be described with reference to the FIGS. 3, 4 and 5.

A guide box 12 for supporting the support arm 6 has been positioned below the loading surface 1 of the truck. As the support arm 6 can be telescopically moved into and out of the guiding box 12, the guiding box is provided with support rollers 13 in order to facilitate the movement of the support arm 6. The construction of the support arm 6 is such, that it can be used as a free extending arm and it has also a large resistance against torsion. Preferably the cross section of the support arm 6 has the shape of a triangle as appears from FIG. 5. The support rollers 13 are situated in accordance with the cross section of the support arm. A hydraulic ram is mounted within the support arm and the piston of the ram can be loaded at both sides. The piston rod 14 is provided with a head 15, which is connected to the support arm. The cylinder 16 of the ram is slidable within the support arm and the foot of the cylinder 16 is connected to the guiding box 12 or to another part of the truck. When the hydraulic medium enters the cylinder at its foot the support arm 6 will slide out of its guiding box and when the hydraulic medium through the line 17 enters at the head end of the cylinder the support arm 6 will be retracted into into the guiding box 12. By means of a lever 18 of a control valve the hydraulic medium for the cylinder 16 can be controlled, the control valve being mounted on the cross arm 7. When the operator draws the knob of the lever 18 the hydraulic medium will enter at the foot of the cylinder 16 and the support arm 6 will follow the operator. When in contradiction thereto the knob of the lever 18 is pushed towards the truck, the hydraulic medium enters the cylinder at its head and the support arm 6 is retracted under the truck. The control of the movement of the support arm 6 is natural and prevents accidents, e.g., when the operator stumbles.

A lever 19 of a control valve (only one lever 19 being shown) is arranged for controlling each of the lift rams 20a and 20b for the forks 10a and 10b respectively. The rams 20a and 20b are mounted at the foot in a bridge 21. The pivot pin 8a or 8b is connected to this bridge 21 in such a manner, that the pivot pin cannot turn with respect to the bridge 21. The upper end of the pivot pin is fastened to an auxiliary bridge 22. Guiding columns 23 and 23b are fastened at the ends of the bridges 21 and 22. The columns 23 and 23b are U-shaped in cross section and the open sides of the columns are directed towards each other. The head of the cylinder 20a or 20b of the rams is fastened to a cross piece 24 of which the ends are also fastened to the columns 23 and 23b. The head of the piston rod 25 of the ram 20a or 20b is mounted in a cap 26 of an inner frame. The inner frame comprises also two guiding columns 27a and 27b which have a U-shaped cross section. These columns 27a and 27b are directed with the open sides towards each other. The columns 27a and 27b are provided with rollers 28, which fit in the guide columns 23 and 23b, whereas the columns 27a and 27b are connected to each other at their lower ends by means of a cross piece 29. Discs rotatably mounted in the cap 26 support two cables or chains 30, of which cables or chains one end is fastened to the cross piece 24 and the other end to a frame 31 of the fork 10a or 10b. The frame possesses rollers 32, which fit in the guide columns 27a and 27b.

When a lever 19 of a control valve is tilted the hydraulic medium is admitted at the foot of the ram 20a or 20b and the piston rod 25 together with the cap and the column 27a or 27b will rise. As the cables or chains 30 run around the rolls in the cap 26 the frame 31 together with the fork 10a or 10b rises also, however, with a speed which is twice that of the inner frame, consisting of the cap 26 and the guide columns 27a and 27b. By the provision of the inner frame it is possible that the frame 31 and the fork can be lowered onto the ground. In doing so the frame 31 can be positioned laterally of the support arm 6. Further a high level for loading and unloading from the truck, the containers of the second layer, can be also obtained.

When the forks 10a and 10b are brought in a position between the containers and the loading surface of the truck and the support arm is entirely retracted, the containers at the rear of the truck are prevented from falling down when the truck during driving will be accelerated. By the provision of the inner frames a sufficient free space between the frames and the road is also obtained, owing to which the frames will not be damaged when the truck drives over an obstacle.

The frames 9a and 9b can be turned around their pivots 8a and 8b respectively by controlling a hydraulic fluid by means of a lever 33 of a control valve. For turning the frames a chain wheel 34a is fastened to the pivot pin 8a and when the chain wheel 34a rotates the bridge 21 of the frame 9a will also rotate. A chain 35a runs around the chain wheel 34a and further along guide rollers 36a into the interior of the cross arm 7. Further the chain runs around a chain wheel 37a, which can freely rotate around the pivot pin 8b. The chain 35a is of the endless type and a part of the chain is fastened to the head of a piston rod 38a of a ram, of which the cylinder 39a is mounted in the cross arm. The piston in the cylinder 39a can be actuated toward both sides, depending upon the position of a lever 33 of a control valve. When now the piston rod 38a moves, the chain 35a rotates the chain wheel 34a, owing to which the pivot pin together with the bridges 21 and 22 of the frame 9a will also rotate.

A chain wheel 34b is fastened to the pivot pin 8b of the frame 9b. The chain 35b, which runs around this chain wheel, runs along guide rollers 36b to a chain wheel 37b, which can freely rotate around the pivot pin 8a. The chain wheel 34b and the free rotatable chain wheel 37b are positioned on a lower level than that of the chain wheels 34a and 37a. Thus the chain 35b runs below the chain 35a. The head of a piston rod 38b of the cylinder 39b is fastened to the chain 35b. The driving of the chain 35b is of the same construction as that of the chain 35a. A lever 33 of a control valve is situated for controlling the hydraulic fluid of the cylinder 39b.

A selection valve which can be controlled by a lever 40 is arranged in such a manner, that by means of the lever 33 either the frame 9a or the frame 9b can be turned around their pivots. The provision of a selection valve is preferred so that the operator of the loading device cannot turn both of the loading devices and will not be subjected to the risk that he will be clamped between the frames 9a and 9b when both frames will rotate in their backwards position as indicated at the left side of FIG. 3.

I claim:

1. A truck which has a horizontal loading surface and is provided with a loading device for placing containers on the loading surface in two longitudinally extending rows, comprising a support arm which extends centrally and longitudinally of the loading surface and parallel thereto, means for displacing the support arm longitudinally, a horizontal cross arm which is secured at its center to the outer end of the support arm so as to extend laterally on both sides of the support arm, two vertically extending frames, each of which is pivoted on a vertical axis at one end of the cross arm and has a fork vertically movable therein, and control means, mounted on the cross arm, for controlling the vertical movement of each fork in order to pick up a container, and for controlling the pivoting of each frame, to deposit the container on the loading surface at the rear end of one of two rows of containers extending longitudinally of the loading surface.

2. A truck according to claim 1 wherein a pair of hydraulic rams are mounted on the cross arm, each hydraulic ram being operatively connected to one of the vertically extending frames for rotating the frame upon its vertical axis.

References Cited

UNITED STATES PATENTS

| 2,142,416 | 1/1939 | Russell | 294—81 |
| 2,899,088 | 8/1959 | Corbin | 214—75 |
| 3,150,404 | 9/1964 | Johnson | 214—132 X |
| 3,259,257 | 7/1966 | Brown et al. | 214—670 X |
| 3,270,899 | 9/1966 | Brown et al. | 214—75 |

FOREIGN PATENTS

| 714,071 | 8/1954 | Great Britain. |
| 1,060,789 | 7/1959 | Germany. |

ROBERT G. SHERIDAN, Primary Examiner

R. B. JOHNSON, Assistant Examiner

U.S. Cl. X.R.

214—671